Patented May 28, 1935

2,002,842

UNITED STATES PATENT OFFICE 2,002,842

THERAPEUTIC AGENT AND PROCESS FOR MAKING COLLOIDAL CALCIUM MALATE

John Torigian, Queens Village, N. Y., assignor to The Drug Products Co. Inc., Long Island City, N. Y., a corporation of New York No Drawing. Application December 6, 1933, Serial No. 701,154

8 Claims. (Cl. 167—68)

This invention relates to a novel therapeutic agent and a process for preparing the same. More particularly, it relates to a new and novel therapeutic agent which is capable of intravenous and intramuscular injection.

For some years numerous attempts have been made to successfully introduce calcium into the blood stream in order to alleviate or cure certain diseases. At the present time calcium is introduced into the blood stream by direct injection of calcium salt solutions, most notably, solutions of calcium chloride and calcium gluconate. The use of calcium salts for injection purposes, however, has been quite limited since, almost invariably, such injections have been attended by intense pain, discomfort and local irritation.

Calcium chloride solutions, when administered intravenously and intramuscularly, have been found to be more or less irritating and frequently the cause of necrosis, a most serious affectation of the bones. Because of this serious disadvantage the use of calcium chloride solutions for injection purposes has found very little favor among physicians.

In recent years calcium has been introduced into the blood stream by injection of calcium gluconate solutions, preferably supersaturated solutions. The use of supersaturated calcium gluconate solutions has apparently enjoyed a more widespread favor than have calcium chloride solutions. The calcium gluconate in these supersaturated solutions, however, is subject to precipitation upon temperature change and when used intravenously often causes nausea and other reactions. Furthermore, intravenously the difference between the effective and toxic doses is very small so that extreme care must be taken in administering the proper dose to the patient. It has been further found that another objection to the gluconic acid radical as a vehicle for the introduction of calcium into the blood stream is that the gluconic radical is rapidly oxidized by the system, becomes separated from the calcium ion and reacts with other ions in the blood, viz., sodium, potassium, magnesium, etc. Due to the sudden change in ionic affinities a burning and irritating sensation is frequently caused.

The calcium in the blood is in two forms: about 75% is colloidal and about 25% is diffused. In solutions of calcium chloride and calcium gluconate the calcium is in the diffused form. This diffused form of calcium does not reach the remote places in the system, such as the bone cartilages, where the calcium is most needed. The calcium in these solutions is thus eliminated through the kidneys within a short time.

After long research it has been found that the disadvantages heretofore enumerated are definitely overcome if calcium is introduced into the blood stream in the form of a colloidal dispersion. The malic acid radical has been found to be an admirable vehicle for calcium injections. It has been found that, due to the slower assimilation by the system of the calcium ion, aqueous solutions of colloidal calcium malate do not give rise to the sudden changes or reactions, as in the case of the chloride and gluconate, which cause pain and local irritation. Because the calcium malate is very finely dispersed in aqueous solution, and not diffused, it is readily miscible with the normal blood and may, consequently, be used intravenously without any untoward reaction. Due to the enormous surface area of the fine particles of colloidal calcium malate and the ready miscibility of the solution with the blood stream, unusual penetrating power is attained, insuring greater and more certain therapeutic activity in a smaller dosage than the use of a larger amount of non-colloidal solution. Colloidal calcium malate in aqueous solution, of a strength representing 1% elemental calcium, has been found to be stable, no turbidity or precipitation occurring under ordinary conditions.

For intramuscular, as well as for intravenous injections, the new solution has proved particularly efficacious, such injections being followed by no pain, irritation, necrosis or other untoward reactions. The toxicity is low as has been proved by intravenous administration in experimental animals in doses 50 to 100 times the human dose without any reaction or change in the condition of the animals.

The preferred method of preparing this new aqueous solution of colloidal calcium malate is outlined in the following procedure, although it is to be distinctly understood that the invention is not limited thereto, the scope of the invention including any feasible method for preparing such a colloidal solution.

29.5 grams of anhydrous calcium chloride are first dissolved in 200 c. c. of water. To this solution is added a solution of 20 grams of sodium hydroxide in 200 c. c. of water to form calcium hydroxide. A dispersing medium, such as sodium gluconate, is then added to the above mixture. In this particular example, a solution of 100 grams of anhydrous sodium gluconate in 200 c. c. of water has been found suitable. A solution of 20 grams of malic acid in 200 c. c. of water is then added, while stirring, to form calcium malate in a fine colloidal dispersion. Throughout the above procedure double distilled deaerated water is used in making up the solutions.

The pH of the solution is adjusted to a value of substantially 8.5 so that the solution is slightly alkaline. Under such conditions, the colloidality of the solution is stabilized and precipitation of the calcium malate prevented. After so adjusting the pH value, a sufficient quantity of double distilled deaerated water is added to make a solution of the desired concentration of calcium. In this particular example, enough water is added to make up 1,000 c. c. The completed solution is then filtered through a filter having a porosity of about 100 microns, thus permitting the solution to pass through without affecting the colloidal properties of the calcium malate. Previously washed and sterilized ampuls of approximately 5 c. c. size are then promptly filled with the solution and the filled ampuls sealed and sterilized at 100° C. for about 45 minutes.

On analysis, each 5 c. c. of the finished solution is found to contain 0.05 grams of finely dispersed colloidal elemental calcium (in the form of malate) which is considered to be the average dose. Through the ultramicroscope the solution demonstrates active and prolonged Brownian movement.

It is obvious that various changes and modifications may be made in the present invention without departing from the spirit thereof, the scope of the invention being limited only by the following claims.

What is claimed is:

1. As a new therapeutic agent for injection purposes calcium malate finely dispersed in aqueous solution.

2. As a new therapeutic agent for injection purposes calcium malate in true colloidal solution having a pH value of substantially 8.5.

3. As a new therapeutic agent for injection purposes calcium malate in true colloidal solution having an effective calcium content of approximately .01 gram per 1 c. c. of solution.

4. As a new therapeutic agent for injection purposes calcium malate in true colloidal solution having an effective calcium content of approximately .01 gram per 1 c. c. of solution and having a pH value of substantially 8.5.

5. As a new therapeutic agent for injection purposes calcium malate in true colloidal solution and a dispersing agent.

6. The product of claim 5 in which the dispersing agent is sodium gluconate.

7. A process for preparing an aqueous solution of colloidal calcium malate comprising reacting calcium chloride with sodium hydroxide, adding sodium gluconate and then adding thereto malic acid.

8. A process for preparing an aqueous solution of colloidal calcium malate comprising precipitating calcium hydroxide, adding a dispersing agent, adding to this reaction mass malic acid, adjusting the pH of the solution to substantially 8.5 and then adding sufficient water so that the resultant solution contains approximately .01 gram of calcium per 1 c. c. of solution.

JOHN TORIGIAN.